United States Patent [19]
Gupta

[11] Patent Number: 5,972,835
[45] Date of Patent: Oct. 26, 1999

[54] FLUIDIZABLE PARTICULATE MATERIALS AND METHODS OF MAKING SAME

[75] Inventor: Raghubir P. Gupta, Durham, N.C.

[73] Assignee: Research Triangle Institute, Research Triangle Park, N.C.

[21] Appl. No.: 08/711,877

[22] Filed: Sep. 12, 1996

Related U.S. Application Data

[60] Provisional application No. 60/003,714, Sep. 13, 1995.

[51] Int. Cl.⁶ .................................................. B01J 20/30
[52] U.S. Cl. ........................ 502/439; 502/400; 502/406; 502/415; 502/504; 502/514
[58] Field of Search .................................. 502/400, 406, 502/415, 504, 514, 517, 439; 264/44

[56] References Cited

U.S. PATENT DOCUMENTS

| | | | |
|---|---|---|---|
| 4,088,736 | 5/1978 | Courty et al. | 423/230 |
| 4,089,809 | 5/1978 | Farrior, Jr. | 252/439 |
| 4,287,050 | 9/1981 | Eastman et al. | 208/215 |
| 4,313,820 | 2/1982 | Farha, Jr. et al. | 208/213 |
| 4,394,297 | 7/1983 | Kolts | 252/437 |
| 4,477,592 | 10/1984 | Aldag, Jr. | 502/342 |
| 4,725,415 | 2/1988 | Kidd | 423/230 |
| 4,769,045 | 9/1988 | Grindley | 48/202 |
| 4,946,814 | 8/1990 | Shi et al. | 502/62 |
| 4,977,123 | 12/1990 | Flytzani-Stephanopoulos et al. | 502/84 |
| 4,990,318 | 2/1991 | Kidd | 423/230 |
| 5,045,522 | 9/1991 | Kidd | 502/405 |
| 5,094,996 | 3/1992 | Kidd | 502/405 |
| 5,135,756 | 8/1992 | Shi et al. | 502/62 |
| 5,143,706 | 9/1992 | Schubert | 423/230 |
| 5,188,811 | 2/1993 | Ayala | 423/230 |
| 5,192,726 | 3/1993 | Holmgren | 502/62 |
| 5,234,884 | 8/1993 | Mouri et al. | 502/405 |
| 5,254,516 | 10/1993 | Gupta et al. | 502/84 |
| 5,330,943 | 7/1994 | Shi et al. | 502/62 |
| 5,334,564 | 8/1994 | Pinnavaia et al. | 502/84 |
| 5,494,880 | 2/1996 | Siriwardane | 502/400 |
| 5,714,431 | 2/1998 | Gupta et al. | 502/400 |

FOREIGN PATENT DOCUMENTS

| | | | |
|---|---|---|---|
| 1-297143 | 11/1989 | Japan | 502/400 |

OTHER PUBLICATIONS

Gangwal et al. "Sulfur Control Options for Integrated Gasification Combined Cycle Power Systems" Proceedings of the 17th Bienniel Low–Rank Fuels Symposium held in St. Louis, Missouri in May 1993 published by Energy and Environmental Research Center in Grand Forks, N.D.; pp. 639–653.

"Toward a Cleaner Coal" Jan./Feb./Mar. 1994 Edition of *Hypotnuse*, p. 16, published by Research Triangle Institute.

Gupta, R.P. and Gangwal, S.K., "Enhanced Durability of Desulfurization Sorbents for Fluidized–Bed Applications", Topical Report to DOE/METC, Contract No. DE–AC21–88MC25006, Nov. 1992, NTIS No. NTIS/DE93000247.

*Primary Examiner*—Gary P. Straub
*Assistant Examiner*—Timothy C Vanoy
*Attorney, Agent, or Firm*—Alston & Bird LLP

[57] ABSTRACT

The invention provides fluidizable, substantially spherical particulate material of improved attrition resistance having an average particle size from about 100 to about 400 microns useful as sorbents, catalysts, catalytic supports, specialty ceramics or the like. The particles are prepared by spray drying a slurry comprising inorganic starting materials and an organic binder. Exemplary inorganic starting materials include mixtures of zinc oxide with titanium dioxide, or with iron oxide, alumina or the like. Exemplary organic binders include polyvinyl alcohol, hydroxypropylmethyl cellulose, polyvinyl acetate and the like. The spray dried particles are heat treated at a first temperature wherein organic binder material is removed to thereby provide a porous structure to the particles, and thereafter the particles are calcined at a higher temperature to cause reaction of the inorganic starting materials and to thereby form the final inorganic particulate material.

49 Claims, No Drawings

FLUIDIZABLE PARTICULATE MATERIALS AND METHODS OF MAKING SAME

CROSS-REFERENCE TO RELATED APPLICATION

This application is related to commonly owned copending Provisional Application Ser. No. 60/003,714, filed Sep. 13, 1995, and claims the benefit of its earlier filing date under 35 U.S.C. § 119(e)

This invention was made with Government Support under Contract No. DE-AC21-88MC25006 awarded by the United States Department of Energy. The Government has certain rights in this invention.

FIELD OF THE INVENTION

The present invention relates to catalysts, sorbent materials, and support materials, and more particularly to large particle catalysts, sorbent materials and support materials, and to processes of preparing the same.

BACKGROUND OF THE INVENTION

Attrition resistance is an important aspect of fluidizable particles, such as catalysts, sorbent materials, reaction surface supports and the like. Fluidizable particles in fluidized beds are used in numerous chemical conversion applications, including catalytic conversions, absorption reactions, and the like. Numerous techniques have been developed over the years to improve attrition resistance of such particles. However, in many cases, these techniques are not suitable for the particular materials used to form particles for a given application. In other cases, many of these techniques can be limited to use with particular particle sizes.

Fluidizable materials based on active zinc compounds sorbent particles have recently been developed for use in the desulfurization of coal gas. Coal represents our largest fossil energy source. The efficiency of converting the chemical energy stored in coal to electricity can be improved by first generating fuel gas via coal gasification, and then oxidizing the hot gas in either a turbine or a fuel cell. This approach, however, is complicated by the presence of sulfur in coal, which is converted to reduced sulfur species such as $H_2S$, COS, and $CS_2$ during gasification. Subsequently, during combustion of the fuel gas, the $H_2S$ oxidizes to $SO_2$ which is environmentally undesirable. In addition to environmental concerns, high concentrations of $H_2S$ can be corrosive to energy producing equipment and can adversely affect the performance of molten carbonate fuel cells due to sulfur poisoning of electrodes.

Early sorbent technology for sulfur removal from fuel gas was directed toward iron oxide. For example, U.S. Pat. No. 4,089,809 assigned to W. L. Farrior, disclosed a solid absorbent consisting of iron oxide supported on silica for removal of $H_2S$ from hot gaseous mixtures. The efficacy of iron oxide sorbents for the absorption of $H_2S$ is dictated by chemical equilibrium constraints. For example, at 550° C. with 20 percent water vapor in coal gas, theoretically iron oxide sorbents can reduce $H_2S$ level to about 361 ppm, but typically not any lower.

In contrast, studies performed using zinc oxide as a sorbent indicate that $H_2S$ levels can be reduced to a few ppm. An example of a zinc oxide sorbent is proposed in U.S. Pat. No. 4,088,736 to Institut Francais du Petrole of France, which discusses zinc oxide sorbent supported on silica and/or alumina. Zinc oxide sorbents hailed as effective sorbents for reduced sulfur species; however, the actual gasifier gases are quite reducing, and zinc oxide sorbents are typically not as effective in these environments as is required in the industry. Pure zinc oxide sorbents are known to lose zinc due to reduction by carbon monoxide and/or hydrogen, both of which are present in fuel gas.

Subsequently, zinc ferrite sorbents were developed. U.S. Pat. No. 4,769,045 to Grindley proposes a representative zinc ferrite sorbent prepared from mixing and calcination of equimolar amounts of zinc oxide and iron oxide. Zinc ferrite sorbents were employed in fixed-bed, moving-bed, and fluidized-bed reactors for desulfurization, but the concerns with respect to sorbent degradation in terms of loss in percent sulfur absorption capacity and mechanical strength remained.

Zinc titanate sorbents were initially developed as an answer to the need for a desulfurization sorbent which exhibits resistance to degradation at the high temperatures and highly reducing coal gas environments of the hot-gases. The use of zinc titanate sorbents as high temperature desulfurization sorbents is proposed in U.S. Pat. Nos. 4,313,820 and 4,725,415, both assigned to Phillips Petroleum Company. The sorbents proposed therein are discussed in relation to fixed bed applications, and have a particle size of 20 to 40 mesh, a size which is unsuitable for fluidized bed applications. U.S. Pat. No. 4,977,123 to Flytzani-Stephanopolous et al., proposes a method of making mixed metal oxide sorbents suitable for use in fixed bed reactors as well. The proposed mixed metal oxide absorbents are prepared using calcined powders of a desired composition as starting materials, adding water to form a paste, extruding the paste, and drying and heating the extruded paste to yield the desired extrudate strength. The oxides may be oxide mixtures of various metals such as for example, copper, iron, aluminum, zinc, titanium, and mixtures thereof. Inorganic binder materials such as bentonite clay may also be added. The proposed method involves a series of complex, hard-to-reproduce, and potentially expensive steps which discourage its use in commercial applications.

Although fluidized bed reactors provide a particularly efficient environment for removal of sulfur compounds from feed streams, zinc titanate sorbent materials suitable for fluidized bed reactor applications have eluded investigators due to the required particle size range, typically from 40 to 300 microns. Fluidized bed reactor applications also require sorbents exhibiting good absorption rate and capacity for sulfur compounds, good regenerability without appreciable loss of efficacy or efficiency, and high attrition resistance.

Attempts have been made to improve the attrition resistance of zinc titanate materials for fluidized bed applications. U.S. Pat. No. 4,477,592 to Aldag, Jr. proposes a process for making a zinc titanate sorbent which includes a hydrogelling step designed to improve attrition resistance. The proposed hydrogelling step, involves dispersion of a finely powdered zinc titanate in a suspension of α-alumina monohydrate with the addition of nitric acid to form a hydrosol, which is dried, calcined at 648° C. for 2 hours, and crushed and screened to produce a 420 to 1190 micron particle size catalyst for use in a transport reactor. The hydrogelling step improved attrition resistance at the expense of reduced catalytic activity primarily due to decreased zinc titanate content.

U.S. Pat. No. 5,254,516, issued Oct. 19, 1993 to Gupta et al discloses highly durable and chemically reactive zinc titanate sorbents having a particle size range of between 50 and 400 microns which are prepared by granulating a mixture of fine zinc oxide and titanium dioxide with an inorganic binder, typically bentonite and/or kaolinite, and an organic binder, and then indurating the granules. The resultant sorbent particles have high particle density and are highly attrition resistant and advantageously are capable of absorbing significant quantities of sulfur compounds from a feed stream. Because of their size, reactivity and durability, these sorbent materials are suitable for use in fluidized bed reactors. However, the granulation process results in the production of particles having sizes distributed over a relatively wide range and typically a substantial portion of the product, e.g., 30–40 wt. percent, has a size too large for use in a fluidized-bed reactor and must be discarded. A related publication describes work leading to the development of this sorbent material; see R. P. Gupta and S. K. Gangwal, "Enhanced Durability of Desulfurization Sorbents for Fluidized Bed Applications", Topical Report to DOE/METC, Contract No. DE-AC21-88MC25006, November, 1992, NTIS No. NTIS/DE93000247. As detailed therein, numerous particle-forming techniques and zinc titanate/binder compositions were investigated prior to the development of these attrition-resistant zinc titanate sorbents.

One particularly desirable technique for the production of a particulate sorbent or catalyst suitable for use in fluidized-beds is the spray drying process. This process has been employed extensively in the production of various catalysts, particularly fluid cracking catalysts. Spray drying offers a number of advantages over granulation or agglomeration particulate-forming processes. For example, spray drying is a commercial process which can be readily scaled to commercial production using existing technology to produce large quantities of a product. Spray drying facilitates the addition of other additives and reagents to the composition since additional reagents can simply be added to a slurry prior to spray drying. Spray drying can also provide particles of highly uniform size and shape. In the production of fluidized bed catalysts, the uniformity of the particulate product results in improved process economics in the form of a higher product yield. In many cases, conventional spray drying techniques can provide nearly a 100 percent yield of particles having a size suitable for use in a fluidized bed. In such cases, little, if any, of the spray dried particles must be discarded as waste.

Spray drying processes are well known in the art and are disclosed in numerous publications. In one spray drying process disclosed in U.S. Pat. No. 4,946,814 to Shi et al., an acid stable surfactant is used in combination with a silica-sol binder system to provide FCC catalysts of significantly improved morphology, selectivity, and attrition resistance. The acid stable surfactant can be added to any one, or all, of the final slurry components including the alumina-silica sol slurry, the clay slurry, the alumina and/or the zeolite slurry.

Conventional spray drying involves the use of silica binders to produce coherent, attrition resistant particles. Although spray dried zinc titanate sorbents formed by conventional spray drying techniques and using conventional binders do exhibit improved attrition resistance, this has been achieved only at the expense of sulfur absorption capacity. Various attempts to prepare spray dried zinc titanate catalysts were made during the study described in the previously mentioned November, 1992, publication of R. P. Gupta and S. K. Gangwal, NTIS No. NTIS/DE930000247. In summary, when either a colloidal silica binder, or a silica binder in the form of polysilicic acid, were employed in the formulations, reactivity of the final sorbent was substantially eliminated. In one portion of the study a skilled outside contractor was commissioned to prepare a group of spray dried zinc titanate sorbents including zinc titanate sorbents free of silica and comprising binders prepared from only bentonite and an organic binder. However the resultant sorbents exhibited poor attrition resistance and an unacceptably low sulfur absorption capacity of less than 12 weight percent sulfur absorption. Subsequent attempts to produce spray dried zinc titanate sorbent materials during this work resulted in the failure to produce a stable slurry, resulting in turn, in failure of the particulate-forming spray drying step.

More recently in work related to the present invention, and disclosed in U.S. Pat. No. 5,714,431, issued Feb. 3, 1998 to Gupta et al., highly uniform and attrition zinc titanate particulate materials of high reactively have been prepared. These materials are spherical particles of uniform size and high reactivity. However, when the composition of the slurry was adjusted sufficiently to increase the average size of the particles, the final particles exhibited substantially decreased attrition resistance.

Spray dried fluidizable catalyst and sorbent materials of high porosity and attrition resistance and an increased average particle size, e.g., above about 80–100 micron, are also desirable in a variety of other chemical treatment and conversion processes throughout the art. However, conventional techniques involving a spray drying step are generally unsuccessful in providing such materials.

SUMMARY OF THE INVENTION

The present invention provides substantially uniform spherical fluidizable particles which have good attrition resistance and an increased particle size. A number of fluidized-bed reactor configurations used in industry, for example, conventional bubbling bed reactors operating in a mixing mode and, to some extent, transport reactor systems, operate more efficiently with larger particles (100 to 300 micron diameter particles or larger) as are provided according to the invention. Furthermore, use of larger particles eliminates the need for a barrier filter downstream of the reactor.

The fluidizable materials of the present invention are based on precursor particles formed of inorganic binder materials mixed with an organic binder and preferably an inorganic active material such as zinc oxide. This mixture is spray dried to form precursor particles of the appropriate size, e.g., from about 100 to about 300 microns average diameter and a total particle size range of between 40 and 400 micron.

The precursor particles are subsequently heated to remove the organic binder and to harden the inorganic binder thus providing a highly porous to attrition resistant large particle structure. In accordance with the invention, the precursor particles are first heated at relatively low temperatures to remove the organic binder from the precursor particles. Following removal of substantially all of the organic binder, the precursor particles are calcined at conventional high temperature calcining conditions. It has been found that this multi-stage heating provides high surface area and both establishes and preserves a highly porous and attrition resistant structure in the final particles.

In general, the fluidizable particles of the invention are in the form of generally spherical particles of substantially uniform size, shape and chemical distribution. The particulate materials of the present invention have substantial surface area due to their high porosity and thus provide good reactivity for efficient removal or conversion of compounds from or in a feedstream, as well as high attrition resistance. Exemplary particles of the invention include catalysts, sorbent materials, catalytic support materials, specialty ceramics and the like.

The inorganic starting materials of the porous, attrition resistant, fluidizable particulate materials of the present invention include any of the types of inorganic materials or reactants known in the art which under appropriate calcination conditions, i.e., sintering at high temperatures, react to form high strength particulate structures. Exemplary particulate material which can be prepared in accordance with the invention include supported zinc titanate catalysts and sorbents, prepared by the reaction of zinc oxide and titanium dioxide; zinc ferrite, prepared by the reaction of zinc oxide and iron oxide; zinc aluminate, prepared by the reaction of zinc oxide and alumina; iron aluminate, prepared by the reaction of iron oxide and alumina; copper titanate, prepared by the reaction of copper oxide titanium dioxide; copper chromite, prepared by the reaction of copper oxide and chromia and the like.

In a preferred embodiment of the invention, the particulate materials are large particle size sorbent materials comprising zinc titanate, which have a high sulfur absorption capacity and attrition resistance. The zinc titanate sorbent particles are prepared by spray drying a particle forming slurry substantially devoid of free silica-containing binders. Preferably the inorganic binder is an alumino-silicate including various natural or synthetic clay-like materials. The organic binder may be any suitable binder known to those skilled in the art. Preferably, the organic binder is a material capable of substantially complete removal by oxidation, evaporation, or a similar destructive or non-destructive removal process during calcination so that it imparts the desired degree of porosity to the final particulate material. Examples of suitable organic binders include, but are not limited to, include hydroxypropyl methyl cellulose, polyvinyl alcohol, poly vinyl acetate, cellulose, hydroxypropyl cellulose, starch, ligno sulfonates, molasses, stearic acid, magnesium stearate, dextrin, gum arabic, sodium borate, boric acid and mixtures thereof. The preferred organic binder is polyvinyl alcohol.

The organic binder is typically employed in the form of an aqueous solution. Preferably sufficient organic binder is used to provide an aqueous solution having a relatively high viscosity of above about 500 cP preferably above about 2000 cP, to enhance dispersion of the starting materials. The viscosity of the aqueous solution is desirably within this range also to provide relatively large particle size materials having the desired individual average pore size and total pore volume in the resultant particles.

The amount of organic binder required to obtain the desired viscosity is dependent upon the particular organic binder selected. Typically, the aqueous solution comprises between about 0.5 and about 10 weight percent organic binder based upon the weight of the aqueous solution. In the embodiment wherein the organic binder is Airvol brand of polyvinyl alcohol, the aqueous solution comprises between about 0.5 and about 10 weight percent organic binder based on the weight of the aqueous solution.

The inorganic binder can be any of the types of inorganic binders known in the art capable of reacting with inorganic starting materials under appropriate conditions, i.e., high temperatures, to form the strength imparting structure of the resultant particle material. For the preferred zinc titanate particle materials of the invention, the inorganic binders preferably contain substantially no free silica to prevent the formation of zinc silicate during calcination by the reaction of zinc oxide and free silica present in the inorganic binder. Zinc silicate has very low reactivity for absorption of reduced sulfur species. Advantageously, a combination or mixture of inorganic binders containing essentially no "free silica" is used, preferably kaolinite in combination with sodium bentonite. Other suitable inorganic binders typically include other forms of bentonite, forsterite, vermiculite, feldspar, Portland cement, oil shale, calcium sulfate, fuller's earth, sodium silicate, bauxitic kaolin, calcium montmorillonite, and mixtures thereof. Advantageously, the binder or binders are selected such that their water absorption properties balance that of the organic binder. In this regard, the use of kaolinite, particularly in combination with sodium bentonite, appears to contribute to improved stability of the slurry, particularly as the viscosity of the slurry increases, and accordingly can prevent gelling as compared to high viscosity slurries prepared using other inorganic binders. In the preferred embodiments of the invention wherein zinc titanate or other active inorganic zinc compositions are prepared, the inorganic binder also preferably includes sodium bentonite which results in improved percent sulfur absorption capacity over materials prepared using other inorganic binders.

The total weight percent of inorganic binder present in the slurry is at least about 1 weight percent. Advantageously, kaolinite is present in an amount of between about 1 and about 20 percent depending on desired particle size, preferably in an amount of between about 5 and about 15 percent, for example in an amount of about 10 percent to provide a particle size of up to about 300 microns. When zinc titanate sorbent is prepared, advantageously, sodium bentonite is present in an amount available to the zinc titanate component, of between about 1 and about 10 percent, preferably in an amount of between about 3 and about 8 percent, more preferably between about 4 and about 6 percent, and most preferably in an amount of about 5 percent. The phrase "amount available" as used herein refers to the use of a combination of one or more inorganic binders together with an inorganic material having active sorbent or catalytic properties. In such cases, a portion of either of the binders, i.e., kaolinite and/or the sodium bentonite, can bind to the other binder and thus be unavailable to the active inorganic material. Accordingly, the "amount available" of inorganic binder is that amount of inorganic binder which, when used in combination with another binder, is sufficient to provide a large particle material having properties, such as sulfur absorption activity, equivalent to materials prepared with the inorganic binder in substantially pure form in the same amount relative to the active material, e.g., zinc titanate.

Highly attrition resistant, large particle precursor materials of the invention are prepared generally by a process comprising (a) forming a dry blend of the inorganic starting materials, (b) preparing a substantially uniform aqueous slurry comprising the dry blend, organic binder, and inorganic binder, spray drying the slurry to produce substantially spherical precursor particles (d) heating the precursor particles to a temperature sufficient to remove greater than about 50 wt. %, preferably greater than about 80 wt. %, and most preferably substantially all, of the organic binder, and thereafter (e) heating the particles to an increased calcination temperature sufficient to chemically react inorganic materials or to form desired crystallographic phases in the inorganic materials.

The first step of the process involves forming a dry blend of inorganic starting materials, preferably zinc oxide and titanium dioxide. Typically, the blend includes between about 0.5 to about 2 parts particulate zinc oxide and about 1 part particulate titanium dioxide. Advantageously, the solid reagents useful in the present invention typically exhibit a fine particle size. Zinc oxide useful in the present invention typically has a very fine median particle size of less than about 0.5 micron, and preferably between about 0.1 and about 0.5 micron. The titanium dioxide useful in the present invention typically exhibits a median particle size of less than about 1 micron, and preferably between about 0.1 and about 1 micron. Preferably, the zinc oxide and titanium dioxide useful in the present invention contain substantially no free silica, and less than 5 percent alumina by weight.

A substantially uniform slurry is then prepared using the starting material dry blend. In addition, the slurry includes the organic binder, the inorganic binder, and any additional reagents desired for imparting additional properties to the sorbent material. The slurry is typically prepared by (1) preparing an aqueous solution of the organic binder having a desired viscosity, (2) adding the dry blend to the solution of organic binder, and (3) adding the inorganic binder to the mixture of the solution containing the organic binder with the dry blend. Typically, the entire process is carried out while mixing to provide a uniform slurry. The solids concentration of the slurry is a noteworthy factor which is capable of impacting the particle size of the end product. Advantageously, the solids concentration of the slurry is typically maintained between about 10 and about 50 weight percent solids, and preferably between about 20 and about 40 weight percent solids to obtain particles having a medium diameter above about 100 microns.

The slurry, once prepared, is spray dried to produce substantially spherical precursor particles. Any suitable method known to those skilled in the art for spray drying the slurry may be employed. Preferably, the slurry is spray dried by passing the slurry at a relatively high pressure through a high pressure spray drying nozzle operating at elevated temperatures in order to form large particles. Typically, the high pressure nozzle is operated at an inlet temperature maintained above about 300° C., preferably above about 340° C., and an outlet temperature maintained above about 125° C., and preferably above about 145° C. Other methods known for spray drying a slurry can also be used in accordance with the method of the invention. For example, for slurries of a lower viscosity, the slurry can be spray dried using a spinning wheel atomizer operating at elevated temperatures.

Some of the advantages of spray drying techniques have been set forth above. In addition, spray drying has been found to generate a more homogeneous chemical distribution of the starting materials, i.e., zinc oxide and titanium dioxide, thus diminishing or even eliminating, deleterious amounts of segregated zinc oxide. Also as noted above, spray drying has the added advantage that substantially all of the produced large particle material is in a useable form.

To prepare the large particle material of the invention, the precursor particles formed by passage through the high pressure nozzle are preferably recovered and are then treated initially under conditions sufficient to substantially completely remove the organic material by oxidation, evaporation, or similar destructive or non-destructive removal process. As will be appreciated by the skilled artisan, the precursor particles are heated until substantially all organic binder material is removed, leaving in place a porous structure equivalent to a network of mini canals which facilitate the flow of feed stock gases to a large reaction surface area. The particles are thereafter calcined at an increased temperature sufficient to convert the active inorganic starting materials, e.g., zinc oxide and titanium dioxide, to the desired inorganic reaction product, e.g., zinc titanate, or to the desired crystalline form.

Specifically, the particles exit the high pressure nozzle and are directed into a heated atmosphere maintained at a temperature sufficient to form substantially dry "green" particles. The "green" particles are then heated in the same or in a different apparatus, in an oxidizing environment maintained at a temperature of between about 300° C. and about 600° C. for a sufficient period of time sufficient to remove the organic material, for example by oxidation, from the precursor particles. Preferably, for zinc oxide and titanium dioxide, the particles are heated at the relatively low temperatures of about 450° C. to about 550° C. to about 2 hours, although, as the skilled artisan will appreciate, the time will vary depending upon the particular organic binder and its amount used.

After the organic binder is removed from the precursor particles, the particles are then treated, i.e., calcined, under conditions sufficient to react the inorganic starting materials, i.e., zinc oxide and titanium dioxide and inorganic binder, thereby form the large particles, i.e., zinc titanate. Preferably, the particles are calcined for between about 1 and about 4 hours. More preferably, the particles are calcined at a temperature of between about 800° C. and about 850° C. for about 2 hours.

The fluidizable particle materials of the present invention may also advantageously include other reagents. In one particularly preferred embodiment of the present invention a surfactant is used in preparing the materials. The surfactant is suitably added to the solution of blend, organic binder, and inorganic binder and mixed prior to spray drying. The addition of the surfactant serves a variety of useful functions. For example, the surfactant produces a more uniform distribution of the inorganic dry blend in the slurry, and improves the attrition resistance of the spray dried particles without degrading the reactivity of the particles, for example, the percent sulfur absorption capacity thereof.

A more uniform distribution of the inorganic compounds which are calcined to form the large particle materials is important to the preparation of effective materials. For example, a non-uniform distribution of zinc oxide and titanium dioxide means that the resultant zinc titanate sorbent can contain free zinc oxide. The presence of free zinc oxide in the sorbent can be deleterious, as even relatively small amounts of free zinc oxide can lead to sorbent degradation. Preferred surfactants for use in the method of the present invention include acid stable surfactants. Particularly preferred acid stable surfactants include fluorohydrocarbon surfactants.

The fluidizable particulate materials of the present invention may also include one or more other reagents or additives which are capable of imparting secondary functions to the materials. For example, reagents or additives may be added which impart catalytic capabilities to the materials, such that the material is not only capable of removing particular compounds, such as sulfur compounds, but is also capable of effecting other useful chemical changes to a feed stock. Examples of reagents or additives which may advantageously be incorporated into the materials of the present invention include, but are not limited to oxides and sulfides of molybdenum, cobalt, copper, tungsten, and nickel.

Particulate fluidizable materials of the present invention are capable of absorbing chemical species, such as reduced sulfur species, in a feed stock stream. For example, for a preferred embodiment of the invention, typically, zinc titanate sorbents of the invention exhibit a percent sulfur absorption capacity with hydrogen sulfide in excess of 15 weight percent sulfur absorption at saturation.

Surprisingly large particle materials of the invention also exhibit high attrition resistance. Typically, the attrition resistance of the material is less than about 20 percent loss after 20 hours, as measured in a 3-hole attrition tester. This represents a dramatic increase in attrition resistance over previously known large particle materials.

The large particle materials of the present invention may advantageously be employed in processes of removing a chemical species from a feed stock, such as a gaseous stream containing reduced sulfur species. An exemplary method of treating, i.e., desulfurizing a gaseous stream includes treating the stream in a reactor containing the zinc titanate sorbent material prepared according to the method of the present invention. Suitable reactors include both fluidized bed reactors and entrained bed reactors. In many cases, subjecting the gaseous stream to treatment with the large particle materials of the present invention can effectively result in the removal of substantially all of the particular chemical species, such as sulfur, in the stream.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention and numerous variations and modifications of the invention will be apparent to those of skill in the art. As used herein, the phrase "free silica" refers to silica which is either in a free form and therefore available for reaction with zinc oxide, or silica forms which may, under the conditions of the process of the present invention, produce free silica. The phrase "free silica" does not include bound silicon oxides, such as aluminosilicates which, under the conditions of the process of the present invention, are incapable of releasing free silica.

The present invention provides large particle size materials which exhibit good reactivity, good regeneration properties, and high attrition resistance, and which advantageously have a relatively large average particle size, i.e., above about 80, preferably above about 100, more preferably above about 150 micron median diameter, preferably up to about 400 microns average diameter. The large particles of the present invention include any of the types of fluidizable particles formed of inorganic starting materials mixed with an organic binder and an inorganic binder and spray dried to form precursor particles of the appropriate size, e.g., from about 80 to about 400 microns. Exemplary particles include catalysts, sorbent materials, reaction surface supports, specialty ceramics and the like.

In a preferred embodiment of the invention, the large particle size sorbent materials are zinc titanate particles, prepared from zinc oxide and titanium dioxide, which can exhibit improved percent sulfur absorption capacity and attrition resistance as compared to previous zinc titanate sorbents.

The large particle size zinc titanate sorbent materials of the present invention are particularly useful in gaseous desulfurization applications, especially in fluidized or entrained bed reactors. Zinc titanate sorbents of the present invention exhibit a high percent sulfur absorption capacity for reduced sulfur species, such as for example $H_2S$, COS, and $CS_2$, and a high sulfur capture capacity, as well as other advantageous characteristics for desulfurization applications. In addition, the zinc titanate sorbents of the present invention have oil refinery applications in the area of $SO_x$ removal. For example, the zinc titanate sorbents of the present invention may be used for the removal of $SO_x$ species including, but not limited to $SO_2$, $SO_3$, and the like. The zinc titanate sorbent of the present invention can also be used for hydrolysis of COS. The sorbent material is currently believed to convert the COS into hydrogen sulfide, which is then removed by absorption.

The large particle size materials of the present invention exhibit a generally spherical shape and substantially uniform chemical distribution of the inorganic starting materials. These large particle size materials can also exhibit good chemical species absorption capacity and attrition resistance, which are retained over extended periods of use, i.e., over numerous absorption-regeneration cycles.

In the currently preferred embodiment of the invention, the large particle materials include particulate zinc oxide and particulate titanium dioxide in suitable molar ratios. Preferred molar ratios of zinc oxide to titanium dioxide will depend on a number of factors, such as the reducing severity of coal gas, desulfurization temperature, and the like. Typically, the sorbent materials include zinc oxide and titanium dioxide in a molar ratio of about 0.5–2:1. Preferably, the zinc oxide and titanium dioxide are employed in a molar ratio of about 1.5:1.

Advantageously, the particulate zinc oxide starting materials useful in preparing the zinc titanate materials of the present invention exhibit a very fine particle size. Preferably, the particulate zinc oxide starting material has a median particle size of less than about 0.5 microns and a surface area of between about 5 and about 15 $m^2/g$. More preferably, the particulate zinc oxide starting materials will have a median particle size between about 0.01 and about 0.5 microns, and a surface area of about 9 $m^2/g$. Particularly preferred particulate zinc oxide will have a median particle size of about 0.1 microns. Additionally, the zinc oxide contains substantially no free silica and less than 5 percent free alumina, and is preferably in a relatively pure form. For example, zinc oxide materials having a purity in excess of 99 percent are preferred. Zinc oxide starting materials having the preferred particle size may be obtained from the Zinc Corporation of America under the trade name KADOX-911. This material is prepared according to a French method in which zinc melt, produced from zinc ore, is boiled in a refining column at 907° C. to produce vapors. The vapors are reacted with a predetermined amount of air to produce the zinc oxide powder having the specified particle size.

The particulate titanium dioxide starting materials useful in preparing the zinc titanate materials of the present invention preferably also exhibit a fine particle size. Preferably, the titanium dioxide starting material has a median particle size of less than about 1 micron, and a surface area of between about 5 and about 15 $m^2/g$. More preferably, the particulate titanium dioxide has a median particle size of between about 0.1 and about 0.5 microns, and a surface area of about 12 $m^2/g$. Particularly preferred particulate titanium dioxide will have a median particle size of about 0.5 microns. Suitable titanium dioxide starting materials will contain substantially no free silica and less than 5 percent free alumina. Particulate titanium dioxide having a relatively high purity, preferably greater than 90 percent, more preferably greater than 94 percent, are preferred. Either the anatase or rutile crystalline forms of titanium dioxide may be employed, although the rutile crystalline form is currently preferred because it is less expensive. Suitable particulate titanium dioxide for use in the method of the present invention may be obtained from duPont Company under the trade name R-900.

The organic binder may be any suitable binder known to those skilled in the art. Preferably, the organic binder is a material capable of substantially complete removal by oxidation, evaporation, or a similar destructive or non-destructive removal process during calcination so that it imparts the desired degree of porosity to the final sorbent material. Examples of suitable organic binders include, but are not limited to, hydroxypropyl methyl cellulose, polyvinyl alcohol, polyvinyl acetate, cellulose, hydroxypropyl cellulose, starch, ligno sulfonates, molasses, stearic acid, magnesium stearate, dextrin, gum arabic, sodium borate, boric acid and mixtures thereof. The preferred organic binder is polyvinyl alcohol.

The amount of organic binder necessary to prepare the solution comprising organic binder is dependent upon the particular organic binder chosen, and its innate viscosity characteristics. The amount of organic binder preferably is sufficient to provide an aqueous solution having a viscosity between about 500 cP and 2,000 cP. The viscosity of the aqueous solution is desirable within this range to provide sufficient dispersion of the starting material, i.e., zinc oxide and titanium dioxide and/or inorganic binder particulates at the desired solids concentration (discussed later). Further, the viscosity of the aqueous solution is desirable within this range to provide large particle size materials having the desired individual average pore size and total pore volume in the resultant particles.

Typically, the organic binder is present in the aqueous solution in an amount of between about 0.5 and about 10 weight percent based upon the weight of the aqueous solution. According to one preferred embodiment, the organic binder solution comprises between about 2 and about 8 weight percent based upon the weight of the aqueous solution of polyvinyl alcohol having the trade designation Airvol, available from Air Products and Chemicals, in aqueous solution.

The preferred organic binders are materials which can provide an aqueous solution of the desired viscosity with the addition of only a small amount of binder material i.e., about 5 wt. percent binder or less. Organic binders which require the addition of larger amounts on a weight percent basis, i.e., a higher concentration of organic binder, to obtain the desired viscosity can result in excess porosity in the final material. This excess porosity disadvantageously reduces the strength and/or surface area of the final particulate material. Preferably, the aqueous solution comprises substantially pure water, although other acids, bases, salts, and the like, which do not negatively affect the properties of the end product may be added. Examples of acceptable additives include, but are not limited to soluble salts and various metal oxides.

Inorganic binders useful in the preparation of the large particle size materials include any suitable inorganic binder known to those skilled in the art which contains substantially no free silica. As previously noted, the presence of free silica-containing binders negatively impacts the percent sulfur absorption capacity of zinc titanate sorbents.

Currently the preferred binder is a mixture of sodium bentonite and kaolinite. As the total solids content and viscosity of the slurry increases, the slurry is more likely to gel, i.e., the dispersed phase of the slurry is more likely to combine with the continuous phase thereof to produce a stiff, viscous jelly-like product that cannot be pumped to a spray drying apparatus. The use of kaolinite is advantageous to stabilize the viscosity of the high viscosity slurry within the desired range and to maintain the desired degree of viscosity, and thus prevent or minimize gelling thereof.

The kaolinite typically has an approximate composition of $SiO_2$-45%, $Al_2O_3$-38.5%, $Fe_2O_3$-0.5%, $TiO_2$-2%, $Na_2O$-0.2%, CaO-0.1%, and $H_2O$-balance. The particles typically exhibit an average particle size of about 1.8 microns and a surface area of between about 9 to about 11 $m^2/g$. Preferably, kaolinite is employed in combination with a fluxing agent such as feldspar and sodium silicate.

Bentonite which is useful in the practice of the present invention typically has an approximate composition of: $SiO_2$-63%, $Al_2O_3$-21%, $Fe_2O_3$-3%, MgO-2.5%, $Na_2O$-2.5%, and $H_2O$-balance. The primary clay mineral of bentonite is montmorillonite, which is composed essentially of an aluminum oxide sheet sandwiched between two silicon dioxide sheets. In contrast, kaolinite is composed essentially of only one silicon dioxide sheet and one aluminum oxide sheet.

Other forms of bentonite, such as calcium bentonite may be employed; however, this is not currently preferred because calcium bentonite must be calcined at a higher temperature to function as a binder. Calcining the precursor particles at a higher temperature results in sintering, which leads to increased pore size and correspondingly decreased surface area. The decreased surface area results in diminished sulfur absorption capacity as compared to sorbent materials prepared using sodium bentonite.

The inventors have found that the use of sodium bentonite provides materials having superior sulfur absorption capacity and attrition resistance as compared to materials prepared using other inorganic binders. Sodium bentonites, which contain between about 2 to about 3 percent sodium are particularly preferred inorganic binders because of (1) their strong electrical charges, (2) their smaller sized particles and greater surface area (approximately 30 $m^2/g$), (3) the sponge-like character of their lattice which permits the free ingress and egress of ions that may be present in the water, and (4) their suspendability and mobility in water which provides a greater opportunity for collision with other floating ions. Sodium bentonites, commonly known as "volclays" are widely used as binders for these reasons.

Examples of other suitable inorganic binders include, but are not limited to other forms of bentonite, forsterite, vermiculite, feldspar, Portland cement, oil shale, calcium sulfate, fuller's earth, sodium silicate, bauxitic kaolin, calcium montmorillonite, and mixtures thereof.

Other suitable inorganic binders include forsterite and vermiculite. Forsterite is a high-temperature refractory composed of magnesium silicate. Vermiculite also exhibits excellent high temperature strength. Neither forsterite nor vermiculite alone provides the superior binding properties observed in the use of bentonite. Accordingly these binders are preferably mixed with other inorganic binders, such as kaolinite and/or sodium bentonite, to provide a suitable inorganic binder for use in the method of the present invention.

Typically, the inorganic binder is added in an amount sufficient to effectively and vigorously bind the starting materials, such as zinc oxide and titanium dioxide molecules, to form the large size particles, i.e., zinc titanate. Necessarily, the optimal amount of inorganic binder will depend upon the particular inorganic binder(s) selected. In a currently preferred embodiment of the present invention, kaolinite is present in an amount available to zinc titanate of between about 1 and about 20 percent, preferably of between about 5 and about 15 percent, and more preferably in an amount of about 10 percent.

Typically, when present, the sodium bentonite is present in an amount available to zinc titanate of at least about 1 weight percent. Preferably, the inorganic binder includes an amount available of sodium bentonite of between about 1 and about 10 weight percent, more preferably an amount available of between about 3 and about 8 weight percent, still more preferably in an amount available of between about 4 and about 6 weight percent and most preferably in an amount available of about 5 weight percent.

The large particle size material is prepared by first dry blending the particulate starting materials to form a dry blend. The starting materials, such as zinc oxide and titanium dioxide, may be dry blended according to any method known to those skilled in the art. For example, the starting materials may be blended using a high shear mixer for a period of time sufficient to create a relatively uniform particulate dispersion thereof. Preferably, the starting materials are mixed in the high shear mixer for between about 30 and about 60 minutes. One skilled in the art will appreciate that other methods of blending particulate starting materials are contemplated by the method of the present invention as well.

Thereafter, a substantially uniform aqueous slurry is prepared which includes the starting materials dry blend; organic binder; and inorganic binder. Typically, the slurry is prepared by (1) preparing an aqueous solution comprising organic binder, (2) adding the dry blend to the solution of organic binder, and (3) adding the inorganic binder to the solution of organic binder and blend. Preferably, the entire process of preparing the slurry is carried out while mixing. More particularly, it is preferred to add the blend to the solution of organic binder while mixing the solution, and to add the inorganic binder while mixing the solution of organic binder and blend. One skilled in the art will appreciate that steps (2) and (3) are advantageously carried out sequentially, although it is possible to perform these steps simultaneously. The present invention also contemplates inversions of the foregoing steps. For example, it is possible, and contemplated by the present invention, that the starting materials blend may be added to the solution containing both the organic and inorganic binders, although this is currently not the preferred method of carrying out the present invention. It is also possible, although not currently preferred, to combine the dry blend with the inorganic binder prior to adding both to the solution containing the organic binder.

The solution comprising the organic binder is preferably prepared in a baffled tank equipped with a high shear mixer, or other suitable mixing or stirring device. Typically, the solution is prepared by adding a predetermined amount of the organic binder to an aqueous solution, as defined above. Thereafter, the blend may be added to this solution, by simply dispensing the blend into the tank containing the solution comprising the organic binder, preferably while mixing. The inorganic binder may be added in a similar manner. In embodiments wherein the inorganic binder comprises two or more inorganic binder materials, as described above, it may be advantageous to blend the two or more inorganic binder materials prior to adding to the solution comprising the organic binder and the starting materials dry blend.

The solids concentration of the prepared slurry affects the size of the particles produced. In particular, the solids concentration of the slurry should be carefully controlled to produce particles of the desired size. In accordance with the present invention, it has been found that a slurry having a solids concentration of between about 10 and about 50 weight percent solids, and preferably between about 20 and about 40 weight percent solids, produces large particles wherein greater than about 60 to 90 percent of the particles have an average size of between about 100 and about 300 microns.

The slurry is then spray dried to produce substantially spherical precursor particles. The spray drying technique of the present invention when used to form zinc titanate or other active zinc inorganic materials, is non-conventional in that the addition of free silica-containing binders conventionally believed to be necessary for spray drying are eliminated from the slurry. Alternatively, when active particulate materials are prepared according to the invention that are not harmed by the presence of free silica, the slurry can include both organic binder and silica or a silica sol. In the case of the latter, the binder and silica sol can be employed in cooperation to prepare a stable slurry of both a deserved viscosity and silicon content. Preferably the slurry is spray dried using a high pressure nozzle operating at an elevated temperature. High pressure nozzles are well known by those skilled in the art, and any suitable high pressure nozzle may be employed in the practice of the method of the present invention. Preferably, the high pressure nozzle is operated at an inlet temperature maintained at above about 340° C. and an outlet temperature maintained at above about 145° C.

In addition, other techniques and equipment known in the art for spray drying a slurry can be used in the method of the invention. As the skilled artisan will appreciate, the present invention has been discussed in terms of high viscosity and high solids content. However, for applications using lower viscosity slurries, the slurry can be spray dried, for example, using a spinning wheel atomizer operating at elevated temperatures. Spinning wheel atomizers are also well known by those skilled in the art, and any suitable spinning wheel atomizer may be employed in the practice of the method of the present invention.

Subsequently, the precursor particles exit the high pressure nozzle preferably into a heated atmosphere to form substantially dry, green strength precursor particles. The precursor particles are then treated in an oxidizing environment. The particles are treated initially under conditions sufficient to remove a substantial portion, i.e., greater than about 50 wt. %, preferably greater than about 80 wt. % of the organic binder. Most preferably the particles are treated in an oxidizing atmosphere under conditions sufficient to substantially completely remove the organic material by oxidation, evaporation, or a similar destructive or non-destructive removal process. As will be appreciated by the skilled artisan, the precursor particles are heated until substantially all organic binder material is removed, leaving in place a porous structure equivalent to a network of mini canals which facilitate the flow of feed stock gases to a large reaction surface area.

The particles are subsequently treated in accordance with the present invention under conditions sufficient to convert or react the starting materials to form the strength imparting structure of the resultant large particle size materials of the invention, for example to convert zinc oxide and titanium dioxide to zinc titanate. Accordingly, the method of the present invention contemplates heating the precursor particles in at least two stages, a first low temperature stage to remove the organic binder and to form the porous, high surface area structure of the particles, and a second higher temperature stage to react the starting materials.

It has been found according to the present invention that the use of at least two heating stages is particularly advantageous in the preparation of large particle size porous materials wherein a removable organic binder is employed to form pores in the final product, particularly when polyvinyl alcohol or a binder of similar reactability is used as the organic binder. In testing conducted by the inventors, precursor particles prepared as described above were initially calcined using conventional single stage high temperature techniques. It was discovered that although the particles did generally exhibit good reactivity, the particles also had undesirably low strength and poor attrition properties. It is believed that during high temperature calcining, oxygen can react rapidly with the carbon atoms of the organic binder to form a gaseous product ($CO_2$) which exits the particles rapidly. The rapid exit of resultant gases can result in an outwardly directed destructive force on the inorganic materials which are not yet hardened into a stable form. The particles can shatter, or at a minimum, the resultant average pore size and total pore volume can be so high so as to adversely affect the strength of the particles.

Accordingly, in the first low temperature heating stage of the method of the present invention, the particles are heated at relatively low temperatures, preferably between about 300° C. and about 600° C., more preferably between about 450° C. and about 550° C., most preferably about 500° C. Advantageously, the particles are heated at a rate of about 15° C. per minute or less, preferably about 10° C. per minute, until the desired temperature is reached.

The particles are heated as noted above for a time sufficient to remove substantially all of the organic binder and to form the porous structure of the particles. The time of heating can vary and is dependent upon various factors, such as the type and amount of the organic binder used, the viscosity of the binder, the rate of oxidation, and the like. The rate of the reaction can be determined using conventional techniques, such as thermogravimetric analysis (TGA), which monitors the rate of the reaction and provides an indication that the reaction is complete by monitoring the weight loss of the particles as a function of time. The rate of the reaction is preferably controlled to minimize the "flux" of the gases exiting the particles. Generally, flux is the flow rate of gas produced by oxidation as it exits the particles. Flux is a function of both the time of the reaction and the "position" of the reaction. The term "position" of the reaction refers to the fact that flux can vary depending upon the location of the specific chemical species undergoing reaction in the oxidizing atmosphere at a given time, i.e., carbon atoms on the surface of the particles as compared to carbon atoms within the particle structure.

Preferably, the precursor particles are heated in the first stage for between about 1 and about 2 hours in the oxidizing environment. According to one preferred embodiment, the precursor particles are heated at a temperature of between about 450° C. and about 550° C. for about 1 hour.

After the particles are heated to form the porous structure thereof, the particles are then treated under conditions sufficient to convert the sorbent starting materials, such as zinc oxide and titanium dioxide, to the resultant particles, i.e., zinc titanate. In a preferred embodiment of the invention, the particles are maintained at a temperature between about 750° C. to about 900° C., preferably between about 800° C. and about 850° C., for a sufficient period of time to convert the zinc oxide and titanium dioxide to zinc titanate. Preferably, the precursor particles are calcined for between about 1 and about 4 hours in the oxidizing environment. According to one preferred embodiment, the precursor particles are calcined at a temperature of between about 800° C. and about 850° C. for about 2 hours.

Suitable oxidizing environments will be readily determinable by one skilled in the art. For example, according to one preferred embodiment, the precursor particles are directed into a kiln operating under an oxidizing environment initially heated to a temperature between about 300° C. and about 600° C., at a rate of about 15° C. per minute or less, and subsequently maintained at a temperature of between about 750° C. and about 900° C. A suitable oxidizing environment will be readily determinable by those skilled in the art. For example, air may be used as the oxidizing environment to complete the solid-solid reaction between zinc oxide and titanium dioxide to zinc titanate.

The entire quantity of particles produced may advantageously be recovered and employed without further modification or purification. The spray drying method advantageously generates a yield of nearly 100 percent usable particles, which provides a significant techno economic advantage as compared to granulation and similar techniques which produce only about 60 to 70 percent usable particles.

During the calcination process, the organic binder tends to burn off, as noted above. The incineration of the organic binder forms a porous structure equivalent to a network of mini canals which facilitate the flow of feed stock gases to a large reaction surface area.

Advantageously additional reagents or additives may be incorporated into the particles or added during the process of preparing the large particle materials. According to one preferred embodiment of the instant invention, the process for preparing the large size particle materials includes the addition of a surfactant. Typically, the surfactant is an acid stable surfactant, such as those described in U.S. Pat. No. 5,135,756 to Shi et al., the disclosure of which is incorporated herein by reference in its entirety. Preferred surfactants are fluorohydrocarbon surfactants having the general formula

wherein $R_f$ is $F(CF_2—CF_2)_{3-8}$ and X is H or $NH_4$. Examples of preferred fluorohydrocarbons useful as surfactants in the present invention include, but are not limited to fluorohydrocarbon surfactant available under the trade name ZONYL TBS™ from duPont Chemical, potassium perfluoroalkyl sulfonates, such as SC-95™ available from 3M, and the like.

The surfactant imparts a number of beneficial characteristics to the large particle size materials of the present invention prior to being burned off in the calcination step. Namely, the presence of the surfactant produces a more uniform distribution of inorganic starting materials, i.e., zinc oxide and titanium dioxide, in the slurry. This is advantageous in that a more uniform chemical distribution abates free zinc oxide. In addition, the surfactant leads to more uniformly sized and shaped particles. The more uniformly sized and shaped particles exhibit higher attrition resistance. Furthermore, the presence of the surfactant increases attrition resistance without compromising sulfur absorption capacity.

The process for making the large particle materials which includes the addition of surfactant can be carried out in substantially the same manner as the materials prepared without the addition of surfactant. More particularly, the surfactant is typically added to the solution comprising the blend, organic binder, and inorganic binder and mixed prior to spray drying. However, one skilled in the art will appreciate that other routes of addition, such as those outlined above are also contemplated.

The preferred surfactants are generally effective in very low concentrations of between about 50 and about 1000 ppm or between about 0.005 and about 0.1 weight percent (based on the weight of solids). Thus, the preferred surfactants are cost effective. In industrial applications, the surfactant is typically added in an amount of about one pound per 2.5 tons of final product. Additionally, it can be advantageous to dilute the surfactant prior to addition to the solution comprising organic binder. In this embodiment, the surfactant is preferably pre-diluted and added as a 1 weight percent aqueous solution.

Still other reagents or additives may also be incorporated into the materials of the present invention. In particular, the inventors have discovered that additional chemical functions, such as for example catalytic properties, may be ascribed to the materials upon the addition of certain reagents. As an example, the addition of oxides or sulfides of various Group I, VI, and VIII transition metals may be employed. Particularly preferred catalytic additives for heavy hydrocarbon cracking include oxides or sulfides of molybdenum, cobalt, copper, tungsten, and nickel. Heavy hydrocarbons, such as tars, are present in fuel gas and are usually derived from fixed-bed gasifiers such as the Lurgi and British Lurgi designs. The zinc titanate sorbent materials of the present invention which incorporate these additives may also act as catalysts to hydrodesulfurize the organic compounds present in the heavy hydrocarbons, such as mercaptans, thiophenes, and benzothiophenes, into hydrogen sulfide, which can subsequently be removed by the sorbent material.

Another potential contaminant in fuel gas is ammonia, which originates mainly from the fuel-bound nitrogen in coal. The quantity of ammonia in fuel gas may be as high as 5000 ppm. One of the most practical ways to remove this contaminant is catalytic decomposition to nitrogen and hydrogen. Suitable catalysts for decomposition of ammonia in combination with the particles of the present invention should exhibit relatively high resistance to poisoning with sulfur. Combinations of transition metal oxides, particularly Group VIII metal oxides, e.g., derived from cobalt and nickel with Group VI metal oxides, e.g., derived from molybdenum and tungsten, with and without additional Group VII and Group VIII metals such as rhenium and iridium, are suitable catalysts for ammonia decomposition. These additives may be incorporated into the materials of the present invention in the same manner as described above for the surfactant. The optimal amount of additive is readily determinable by one skilled in the art.

Detailed physical and chemical characterization of zinc titanate sorbent materials prepared according to the processes of the present invention can be carried out in various ways. Preferably the evaluation of physical characterization includes an analysis of particle size distribution, pore size distribution, BET surface area, X-ray diffraction patterns, scanning electron microscopy (SEM) coupled with energy-dispersive X-ray (EDX), and attrition resistance. The evaluation of chemical characteristics includes percent sulfur absorption capacity measured in a thermogravimetric analyzer.

The particle size distribution can be determined using a sieve train and sonic sifter according to techniques known to those skilled in the art. The pore size distribution can be measured using conventional techniques, such as for example techniques employing the AutoPore II 9220 instrument manufactured by Micromeritics Instrument Company. The BET surface area can be evaluated using conventional techniques, such as techniques employing a Quantasorb analyzer.

The sorbent materials produced according to the processes of the present invention typically exhibit an average particle size of between about 100 and about 400 microns preferably between about 125 and about 375 micron. By this it is meant that typically greater than about 95 percent, preferably greater than about 98 percent, and more preferably greater than about 99 percent of the particles produced by the method of the present invention will have an average particle size in the specified range, e.g., of between about 100 and about 400 microns. This particle size is advantageously well within the required range for fluidized-bed reactor applications as noted previously. In addition, the method of the present invention may be used to produce smaller particles having an average particle size of up to about 100 microns. Smaller size particles may be produced by modifying the spray drying conditions, as will be appreciated by one skilled in the art. The surface area of the particles is typically between about 2 to about 16 $m^2/g$.

Attrition resistance is a direct measure of the mechanical strength of the sorbent material. It is preferred for applications in fluidized-bed reactors, that the sorbent material possess a relatively high attrition resistance so that percent sulfur absorption capacity is not compromised after extended periods of use, and so that the sorbent material may be repeatedly regenerated rather than discarded once saturation has occurred. Attrition resistance can be evaluated using ASTM (American Society for Testing and Materials) Procedure ASTM D5757-95, "Determination of Attrition and Abrasion of Powdered Catalysts by Air Jets" published September, 1995. Catalyst manufacturers have also developed their own versions of an attrition test for evaluating attrition resistance of particles in the 50 to 400 micron range. As a reference point in these tests, commercial fluid cracking catalysts are typically employed.

A three-hole tester was employed to evaluate attrition resistance. A detailed description of this tester can be found in U.S. Pat. No. 4,010,116 to Secor et al. The zinc titanate sorbent materials of the present invention were analyzed using substantially the same test as described in Secor et al. '116, with the exception that house air was substituted in place of the humid air employed by Secor et al., and attrition rate was calculated rather than using the attrition index of Secor et al. Briefly the attrition tester includes two sections. The upper section of the tester has a diameter of 5¾ inches and the lower section has diameter of 1⅝ inches. The large diameter of the upper section serves as an elutriator for the separation of fines less than 20 microns, which are ultimately collected in the flask/filter assembly. A perforated plate is used which contains three 0.4 mm diameter holes. Attrition resistance is measured in terms of attrition rate. Attrition rate is determined by loading 50 g of sample of known particle size range into the tester, passing air through the tester at the rate of 7 slpm, and intermittently stopping the gas flow after 5 hours and weighing the filter/flask assembly to determine the amount of fines collected. The test is continued for up to about 20 hours, and the remaining sample is collected from the tube, and weight and particle size distribution are measured.

Attrition resistance is calculated by measuring the amount of fines collected over 5 hours and 20 hours and the percent loss is calculated based on the initial 50 g of sorbent loaded into the tester. Attrition tests are relative tests, and an absolute value cannot be assigned. These tests are, however, widely recognized in the art as useful for establishing a relative ranking of materials in terms of attrition resistance.

The zinc titanate sorbent materials of the present invention typically exhibit a weight loss of less than about 85 percent after 5 hours, and less than about 95 percent after 20 hours using the three-hole attrition tester. The zinc titanate sorbent materials prepared with the addition of surfactant demonstrate a substantially higher attrition resistance. Typically the zinc titanate sorbent materials prepared with the addition of surfactant exhibit an attrition loss of less than about 10 percent after 5 hours, and less than about 20 percent after 20 hours using the three-hole attrition tester. Both materials exhibit attrition resistance sufficient for applications in entrained bed reactors, however, due to its substantially higher attrition resistance, zinc titanate sorbent materials prepared with the addition of surfactant are preferred for fluidized bed reactors.

In a commercial system, to minimize the material losses due to attrition, the material can advantageously be used in a partially sulfided state to improve its attrition resistance. Consequently, the partially sulfided material will substantially reduce the sulfate formation during regeneration which is believed to be catalyzed by zinc oxide. It has been discovered that a complete sulfidation of zinc titanate material is not needed as partial sulfidation improves the attrition resistance significantly. Partial sulfidation of these materials may be achieved by treating them with a slipstream of hydrogen sulfide containing reducing gas under mildly fluidizing conditions. Once a desired level of sulfidation is achieved, the material may be used for actual operation. Such an arrangement may lead to a significant reduction in the amount of material lost due to attrition, which will eventually result in tremendous cost savings despite the initial costs associated with the partial sulfidation procedure. The sulfur absorption capacity of the sorbent materials can be evaluated using a thermogravimetric analyzer (TGA). TGA sulfur absorption capacity can be evaluated using a duPont 1090 Thermal Analysis system interfaced with a computer in a simulated gas, according to methods known to those skilled in the art. The zinc titanate sorbent materials prepared according to the processes of the present invention exhibit a sulfur absorption capacity in excess of about 15 weight percent sulfur absorption at saturation, and preferably in excess of about 18 weight percent sulfur absorption at saturation. The percent sulfur absorption capacity is calculated by measuring the increase in mass of the sorbent following absorption of sulfur species, and doubling the percent mass increase. Doubling the percent mass increase is required because when zinc titanate reacts to form zinc sulfide, an atom of oxygen is released as each atom of sulfur is absorbed. Accordingly, for each 16 g increase in weight, 32 g of sulfur have been absorbed.

The zinc titanate sorbents prepared according to the processes of the present invention are useful in processes for desulfurizing feed stock, particularly gaseous feed stock. The sorbents of the present invention exhibit a high sulfur absorption rate to reduced sulfur species, such as for example $H_2S$, COS, and $CS_2$, a high sulfur capture capacity, good regenerability and high attrition resistance, as described above. An exemplary method of desulfurizing a gaseous stream of feed stock includes treating the stream in a reactor containing the zinc titanate sorbent material prepared according to the method of the present invention. Preferably, subjecting the gaseous stream to the zinc titanate sorbent of the present invention effectively results in the removal of substantially all of the sulfur in the stream. Both entrained-bed and fluidized-bed reactors are suitable for use with the sorbent materials prepared according to the process of the present invention.

Entrained-bed and fluidized-bed reactors are well known in the art. In the examples which follow, a typical bench scale fluidized bed reactor system is employed which comprises either a 2-inch or a 3-inch I.D. SS-316 pipe with a porous alumina plate in the bottom that acts as a gas distributor. The exit gas from the reactor is cooled to condense the steam and a slipstream of water-free gas is sent to an attached gas analysis system containing a series of gas chromatographs and continuous gas analyzers. In a typical bench run, about 500 g of the precalcined sorbent of particle size between about 100 to about 300 microns is placed in the reactor and the reactor is heated to a predetermined temperature typically between about 500° C. and about 700° C., with continuous flow of nitrogen or other inert gas. Once the desired temperature is attained, the flow of the simulated fuel gas to the reactor is started and the concentration of hydrogen sulfide is measured continuously in the effluent gas. Once the hydrogen sulfide concentration reaches 500 ppmv which is arbitrarily defined as the breakthrough point, the run is stopped and the system is prepared for regeneration.

Regeneration of the sulfided material is typically carried out at about 650° C. with 2 to 5 percent oxygen in nitrogen. These regeneration conditions are needed to prevent zinc sulfate formation and to avoid deadburning of the material due to an excessive rise in temperature because of the highly exothermic nature of the regeneration reaction. The regeneration of the sulfided material is carried out until the sulfur dioxide ($SO_2$) concentration in the reactor effluent stream reaches below about 500 ppm. These sulfidation-regeneration cycles are repeated as many times as desired. Typically each material is tested for 10 cycles to obtain meaningful data on mechanical durability and sulfur absorption capacity.

A process for the desulfurization of a gaseous stream using an entrained-bed or a transport reactor may be carried out in a similar manner, with the adjustments required being well within the skill of those in the art.

The following example is provided to illustrate the present invention, and should not be construed as limiting thereof. In these examples, percent (%) means percent by weight unless otherwise indicated, 1 means liters, $\mu$ means microns, $m^2/g$ means meters square per gram, ppm means parts per million by volume, lbs means pounds, and ° C. means degrees Centigrade.

EXAMPLE

Preparation and Characterization of Zinc Titanate Sorbent

A solution of organic binder was prepared by mixing dry polyvinyl alcohol powder in water. Zinc oxide and titanium dioxide powders were dry blended in a molar ratio of 1.5:1. This dry blend was then added to the polyvinyl alcohol solution with high shear mixing. Subsequently, kaolinate and bentonite clay powders were added in an amount necessary to provide 10% by weight kaolin and 5% by weight sodium bentonite in the final sorbent. To this slurry, about 5 g of duPont ZONYL TBS™ surfactant diluted 20:1 with deionized water was added. The entire slurry was then mixed for about 5 minutes. The final slurry had a concentration of about 30% solids by weight and had a viscosity of about 2000 cP which resulted from the quantity of polyvinyl alcohol binder used in preparing the slurry.

Following mixing, the slurry was pumped to an Anhydro Model Type III-A No. 4 spray drier employing a high pressure nozzle and was sprayed into a heated atmosphere. The heated atmosphere generally was defined by a vertical chamber through which the particles fell, and included hot air flowing in a counter current fashion with respect to the sprayed particulate material, i.e., upwardly through the chamber to provide maximum drying force.

Green spray dried particles were recovered and were initially heated in air in a tray drier at a temperature of about 500° C. for 1 hour, followed by calcining in air at a temperature of 800° C. for 2 hours. The resulting zinc titanate sorbent material was 85% zinc titanate, 10% kaolinite, and 5% bentonite. The physical and chemical properties of this material are set forth in Table 1, below.

TABLE 1

Properties of Zinc Titanate (ZT) Sorbent compound

| Characteristic | Value |
| --- | --- |
| Average particle Size ($\mu$) | 160 |
| Attrition Resistance (% loss) | |
| after 5-hr | 5.80 |
| after 20-hr | 12.00 |
| Surface Area (m$^2$/g) | 14.2 |
| Zn-to-Ti atomic ratio | 1.5 |
| Sulfur Absorption Capacity at Saturation (wt. %) | 19.5 |

This material was tested in a 40-ft tall transport reactor system. In this test, the sorbent was pneumatically transported as a dilute suspension of particles in a simulated fuel gas. Using a gas velocity of about 5 m/sec and an extremely dilute suspension of a density in the order of 0.5 lbs/ft$^3$, this sorbent reduced the H$_2$S level of coal gas from 12,000 ppm to less than detectable limits (<5 ppmv) within a residence time of about 2 sec in the reactor in a temperature range of 550 to 650° C. and 100 psi pressure. The sulfided sorbent was regenerated using pure air in this transport reactor system. In this test, about 50 sulfidation-regeneration cycles were performed. The sorbent loss, defined as amount of fines having a size less than 20$\mu$ diameter generated, due to attrition during these 50-cycles was about 10%. If attrition is defined based on a particle diameter of <11 microns, the sorbent loss was only 5.1 weight percent. The TGA and bench-scale tests conducted on the 50-cycle reacted material indicated no decline in sorbent's chemical reactivity. The high reactivity and superb attrition resistance make this material extremely attractive for commercial hot-gas desulfurization fluidized-bed applications.

That which is claimed is:

1. A process for making attrition resistant spray dried fluidizable particles having an average particle size of between 100 and 400 microns, comprising:
    forming an aqueous slurry comprising a plurality of inorganic starting materials selected from the group consisting of metal oxides and silica and an organic binder;
    spray drying the slurry to produce substantially spherical precursor particles;
    heating the precursor particles to a temperature between about 300° C. and about 600° C. in an oxidizing atmosphere and for a time sufficient to remove greater than about 50 wt. % of the organic binder to thereby provide a porous structure to said precursor particles; and
    heating the particles of porous structure to an increased calcination temperature between about 750° C. and about 900° C. in an oxidizing atmosphere and for a time sufficient to cause the inorganic materials to form an inorganic reaction product and thereby for said fluidizable particles of said average particle size.

2. The process of claim 1, wherein said step of heating the precursor particles comprises heating the precursor particles to a temperature sufficient to remove greater than about 80 wt. % of the organic binder.

3. The process of claim 1, wherein said step of heating the precursor particles comprises heating the precursor particles to a temperature sufficient to remove substantially all of the organic binder.

4. The process of claim 1, wherein said step of heating the precursor particles comprises heating the precursor particles in an oxidizing environment at a temperature between about 450° C. and about 550° C. for about 2 hours.

5. The process of claim 1, additionally comprising the step prior to said step of forming an aqueous slurry of forming a dry blend of said inorganic starting materials comprising tie step of dry mixing inorganic starting materials selected from the group consisting of zinc oxide and titanium dioxide; zinc oxide and iron oxide; zinc oxide and alumina; iron oxide and alumina; copper oxide and titanium dioxide; and copper oxide and chromia.

6. The process of claim 5, wherein said step of forming a dry blend of inorganic starting materials comprises dry mixing zinc oxide and titanium dioxide to provide a zinc oxide/titanium dioxide dry blend.

7. The process of claim 6, wherein said step of forming a dry blend of inorganic starting materials comprises dry mixing between about 0.5 to about 2 parts zinc oxide having a particle size of between about 0.1 to about 0.5 micron, and about 1 part titanium dioxide having a particle size of between about 0.1 to about 1 micron, to provide a zinc oxide/titanium dioxide dry blend.

8. The process of claim 7, wherein said step of dry mixing comprises dry mixing about 1.5 parts zinc oxide having a particle size of between about 0.1 to about 0.5 micron, and about 1 part titanium dioxide having a particle size of between about 0.1 to about 0.5 micron, to provide a zinc oxide/titanium dioxide dry blend.

9. The process of claim 6, wherein each of said zinc oxide and said titanium dioxide contains substantially no free silica and contains between about 0 to about 5 percent alumina by weight, and wherein said titanium dioxide is selected from the group consisting of rutile and anatase.

10. The process of claim 1, wherein said step forming an aqueous slurry comprises:
    (1) preparing an aqueous solution comprising a sufficient amount of said organic binder to provide a solution having a viscosity of between about 500 cP and 2,000 cP;
    (2) adding a dry blend of said inorganic starting materials to said solution of organic binder; and
    (3) adding an inorganic binder to said solution of organic binder and blend.

11. The process of claim 10, further comprising adding surfactant to said solution of organic binder, blend, and inorganic binder.

12. The process of claim 11, wherein said surfactant comprises an acid stable surfactant.

13. The process of claim 12, wherein said surfactant comprises an acid stable fluorohydrocarbon surfactant.

14. The process of claim 13, wherein said surfactant is selected from the group consisting of flurohydrocarbons and potassium perfluoroalkyl sulfonates.

15. The process of claim 10, wherein said step (1) of preparing the aqueous solution comprises preparing an aqueous solution comprising between about 0.5 to about 10 weight percent of said organic binder.

16. The process of claim 10, wherein said inorganic binder is selected from the group consisting of kaolinite, bentonite, bentonite, forsterite, vermiculite, feldspar, Portland cement, oil shale, calcium sulfate, fuller's earth, sodium silicate, bauxitic kaolin, calcium montmorillonite, and mixtures thereof.

17. The process of claim 16, wherein said inorganic binder comprises kaolinite and sodium bentonite.

18. The process of claim 17, wherein said inorganic binder comprises kaolinite in an amount of between about 1 and about 20 percent and sodium bentonite in an amount available of between about 1 and about 10 percent.

19. The process of claim 18, said inorganic binder comprises an amount available of sodium bentonite of between 3 to about 8 weight percent.

20. The process of claim 1, wherein said aqueous slurry comprises a solids concentration between about 10 and about 50 weight percent.

21. The process of claim 20, wherein said aqueous slurry comprises a solids concentration between about 20 and about 40 weight percent.

22. The process of claim 1, wherein said slurry further comprises at least one catalytic agent selected from the group consisting of oxides and sulfides of Group I, VI, and VIII transition metals and mixtures thereof.

23. The process of claim 22, wherein said at least one catalytic agent is selected from the group consisting of oxides or sulfides of molybdenum, cobalt, copper, tungsten, and nickel and mixtures thereof.

24. The process of claim 22, wherein said at least one catalytic agent is selected from the group consisting of a combination of oxides of Group VIII transition metals with oxides of Group VI transition metals.

25. The process of claim 1, wherein said organic binder is selected from the group consisting of hydroxypropyl methyl cellulose, polyvinyl alcohol, poly vinyl acetate, cellulose, hydroxypropyl cellulose, starch, ligno sulfonates, molasses, stearic acid, magnesium stearate, dextrin, gum arabic, sodium borate, boric acid and mixtures thereof.

26. The process of claim 25, wherein said organic binder comprises polyvinyl alcohol.

27. The process of claim 1, wherein said step of heating the particles of porous structure to an increased calcination temperature comprises calcining said particles for a time of between about 1 to about 4 hours.

28. The process of claim 1, wherein said step of heating the particles of porous structure to an increased calcination temperature comprises calcining said particles in an oxidizing atmosphere at a temperature of between about 800° C. to about 850° C. for about 2 hours.

29. The process of claim 1, wherein at least about 60 percent of said attrition resistant particles have an average particle size of between about 100 to about 400 microns average diameter.

30. A process for preparing a zinc titanate sorbent material in the form of fluidizable attrition resistant particles having an average particle size between 100 and 400 microns and capable of absorbing sulfur compounds from a gaseous feed, said process comprising:

(a) forming a zinc oxide/titanium dioxide dry blend comprising between about 0.5 and about 2 parts particulate zinc oxide having a median particle size of less than about 0.5 micron, and about 1 part particulate titanium dioxide having a median particle size of less than about 1 micron;

(b) preparing a substantially uniform aqueous slurry comprising said zinc oxide/titanium dioxide dry blend, organic binder, and inorganic binder, and wherein said slurry comprises substantially no free silica;

(c) spray drying the slurry to produce substantially spherical precursor particles;

(d) heating the precursor particles to a temperature between about 300° C. and about 600° C. in an oxidizing atmosphere and for a time sufficient to remove greater than about 50 wt. % of the organic binder; and (e) calcining said particles at a temperature of between about 750° C. and about 900° C. in an oxidizing atmosphere for a time sufficient to convert the zinc oxide and titanium dioxide to zinc titanate and thereby form said fluidizable particles of said average particle size.

31. The process of claim 30, wherein said step (d) of heating the precursor particles comprises heating the precursor particles to a temperature sufficient to remove greater than about 80 wt. % of the organic binder.

32. The process of claim 30, wherein said step (d) of heating the precursor particles comprises heating the precursor particles to a temperature sufficient to remove substantially all of the organic binder.

33. The process of claim 30, wherein said step (d) of heating the precursor particles comprises heating the precursor particles in an oxidizing environment at a temperature between about 450° C. and about 550° C. for about 2 hours.

34. The process of claim 30, wherein said step (e) of heating the particles to an increased calcination temperature comprises calcining said particles for a time of between about 1 to about 4 hours.

35. The process according to claim 30, wherein said step (e) of heating the particles to an increased calcination temperature comprises calcining said particles in an oxidizing atmosphere at a temperature of between about 800° C. to about 850° C. for about 2 hours.

36. The process of claim 30, wherein each of said zinc oxide and said titanium dioxide contains substantially no free silica and contains between about 0 to about 5 percent alumina by weight, and wherein said titanium dioxide is selected from the group consisting of rutile and anatase.

37. The process of claim 30, wherein said step (b) of preparing the slurry comprises:

(1) preparing an aqueous solution comprising a sufficient amount of organic binder to provide a solution having a viscosity of between about 500 cP and 2,000 cP;

(2) adding said dry blend to said solution of organic binder; and (3) adding said inorganic binder to said solution of organic binder and blend.

38. The process of claim 37, further comprising adding surfactant to said solution of organic binder, blend, and inorganic binder.

39. The process of claim 38, wherein said surfactant comprises an acid stable surfactant.

40. The process of claim 39, wherein said surfactant comprises an acid stable fluorohydrocarbon surfactant.

41. The process of claim 39, wherein said surfactant is selected from the group consisting of fluorohydrocarbons and potassium perfluoroalkyl sulfonates.

42. The process of claim 30, wherein said step (b) of preparing the slurry comprises preparing an aqueous solution comprising between about 0.5 to about 10 weight percent of said organic binder.

43. The process of claim 30, wherein said slurry comprises a solids concentration between about 10 and about 50 weight percent.

44. The process of claim 43, wherein said slurry comprises a solids concentration between about 20 and about 40 weight percent.

45. The process of claim 30, wherein said slurry further comprises at least one catalytic agent selected from the group consisting of oxides and sulfides of Group I, VI, and VIII transition metals and mixtures thereof.

46. The process of claim 30, wherein said organic binder comprises polyvinyl alcohol.

47. The process of claim 30, wherein said inorganic binder comprises kaolinite in an amount of between about 1 and about 20 percent and sodium bentonite in an amount available of between about 1 and about 10 percent.

48. The process of claim 47, said inorganic binder comprises an amount of sodium bentonite of between 3 to about 8 weight percent.

49. The process of claim 30, wherein greater than about 60 to about 90 percent of said attrition resistant particles have an average particle size of between about 100 to about 400 microns average diameter.

* * * * *

UNITED STATES PATENT AND TRADEMARK OFFICE
CERTIFICATE OF CORRECTION

PATENT NO. : 5,972,835
DATED : October 26, 1999
INVENTOR(S) : Gupta

It is certified that error appears in the above-identified patent and that said Letters Patent is hereby corrected as shown below:

Title page, References Cited [56], OTHER PUBLICATIONS, line 8, "Hypotnuse" should read --Hypotenuse--.

Column 21, line 64, "for" should read --form--.

Column 22, line 13, "tie" should read --the--.

Signed and Sealed this

Sixth Day of June, 2000

Attest:

Attesting Officer

Q. TODD DICKINSON
*Director of Patents and Trademarks*